May 26, 1970     N. W. DONNER     3,513,584
FISHING BUCKET
Filed Dec. 13, 1968     4 Sheets-Sheet 1
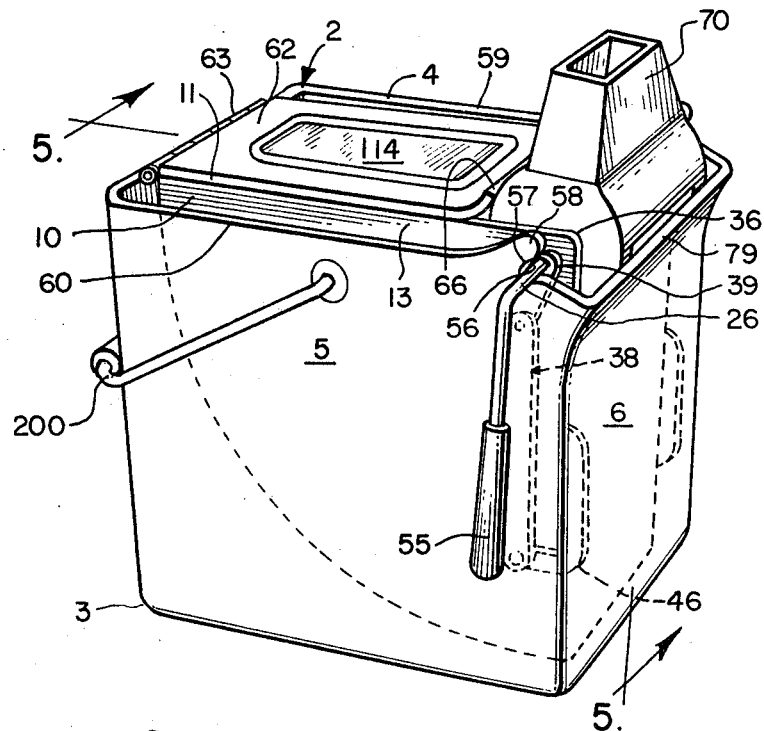
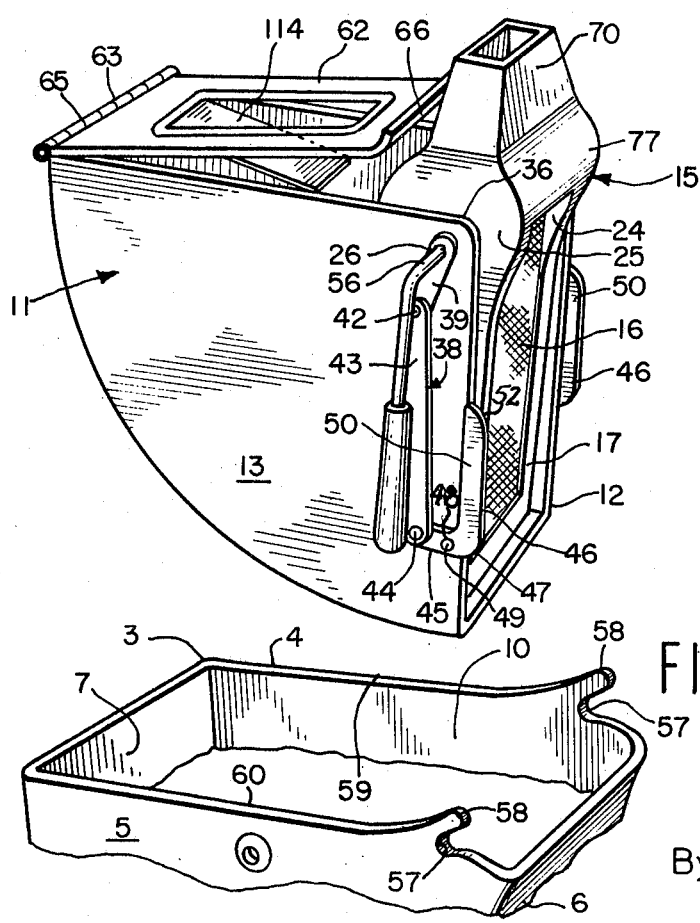
Inventor
Norman W. Donner
By John L. Kowaik
Attorney May 26, 1970 — N. W. DONNER — 3,513,584
FISHING BUCKET
Filed Dec. 13, 1968 — 4 Sheets-Sheet 2
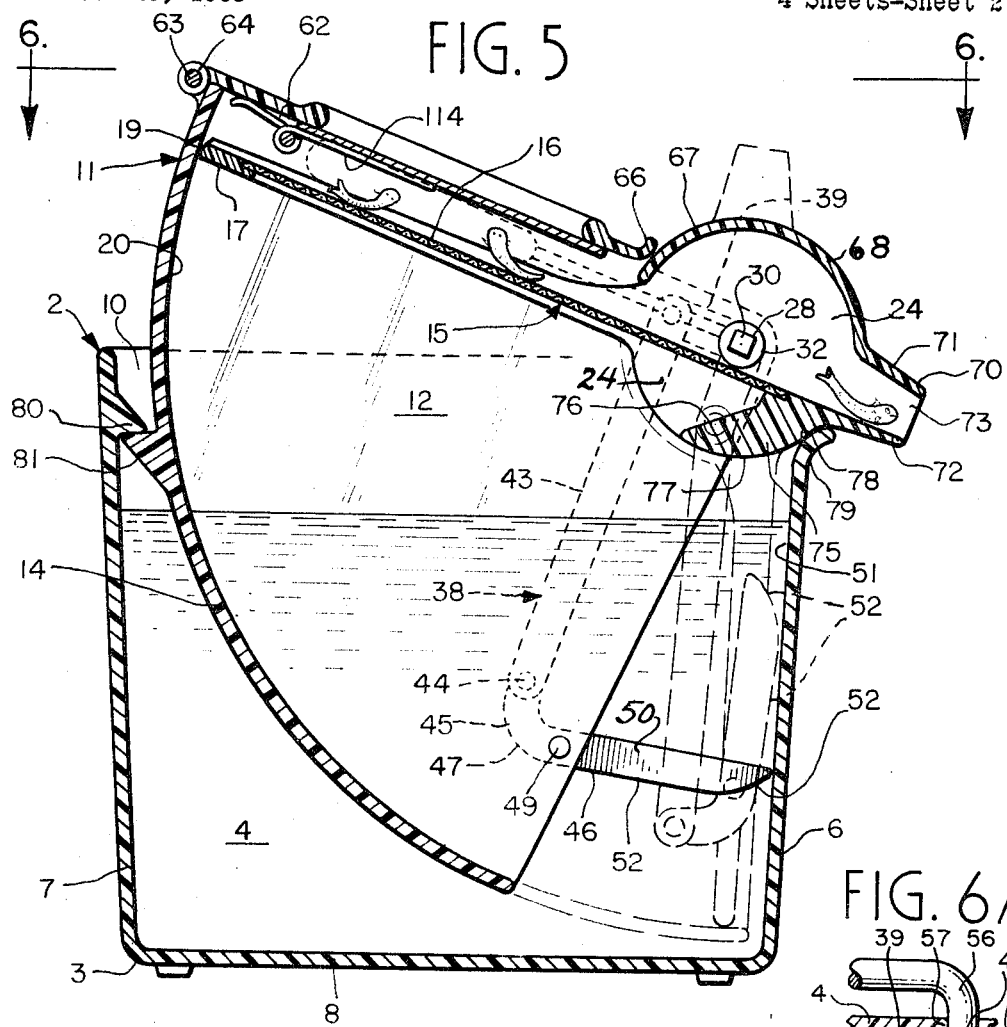
FIG. 5
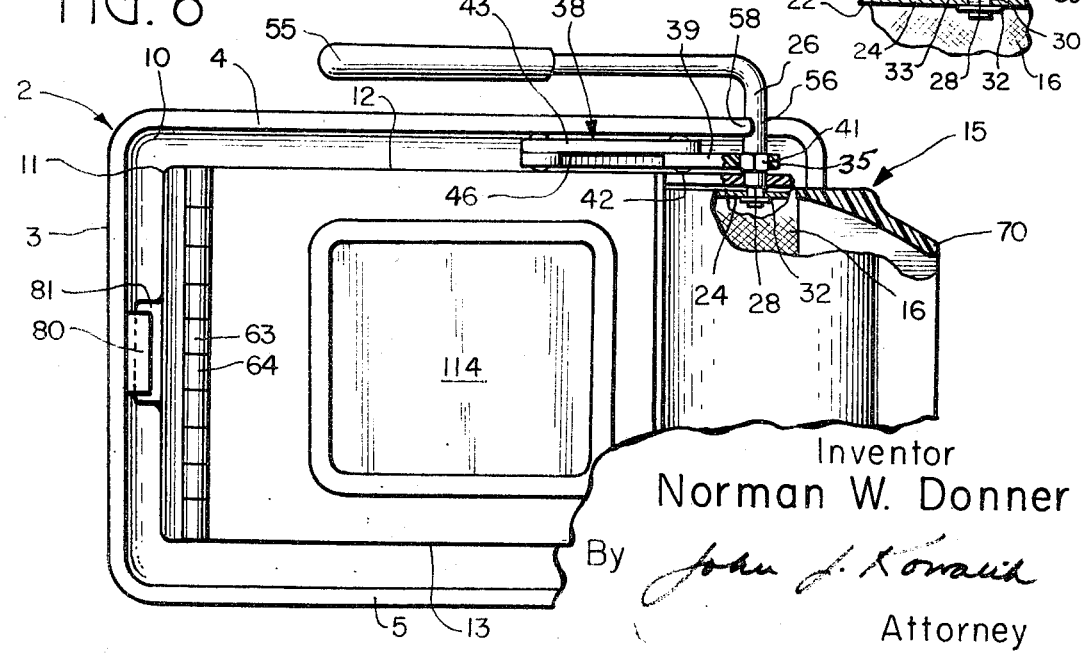
FIG. 6
FIG. 6A
Inventor
Norman W. Donner
By John J. Kowalik
Attorney Inventor
Norman W. Donner
By John J. Kowalik
Attorney

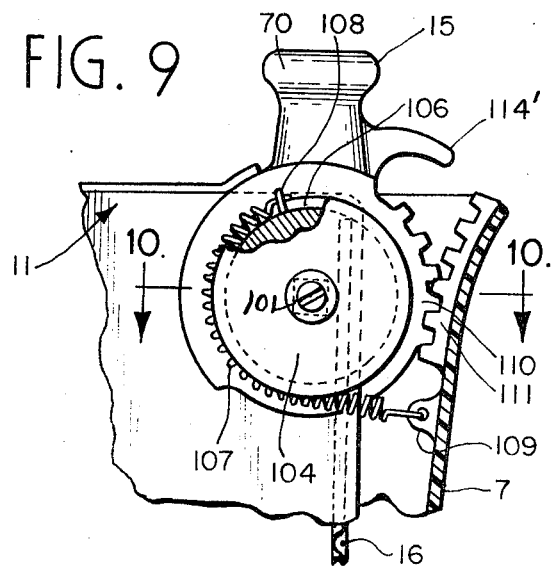
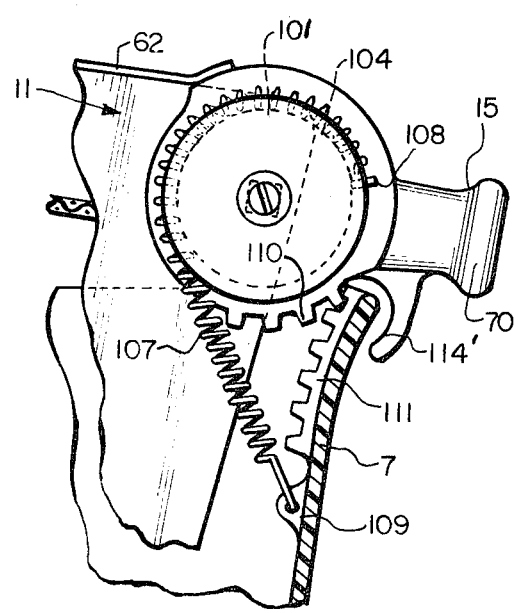
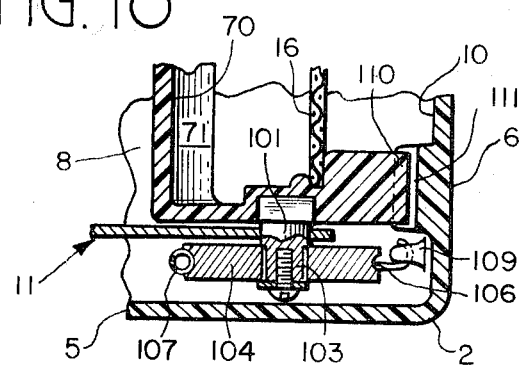
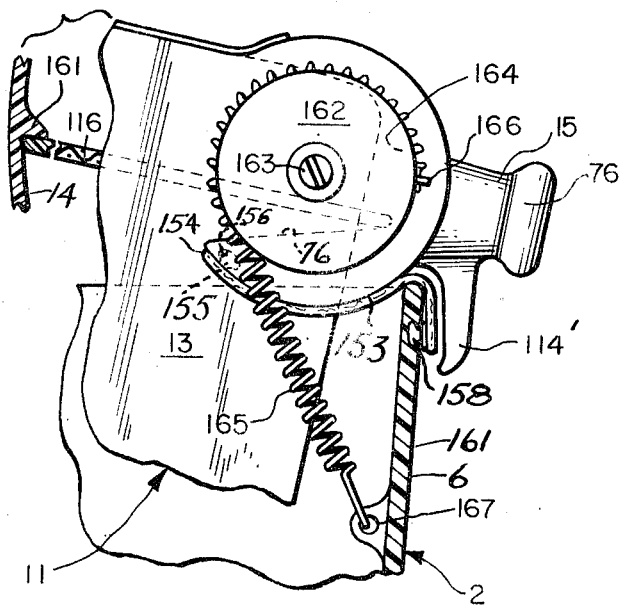
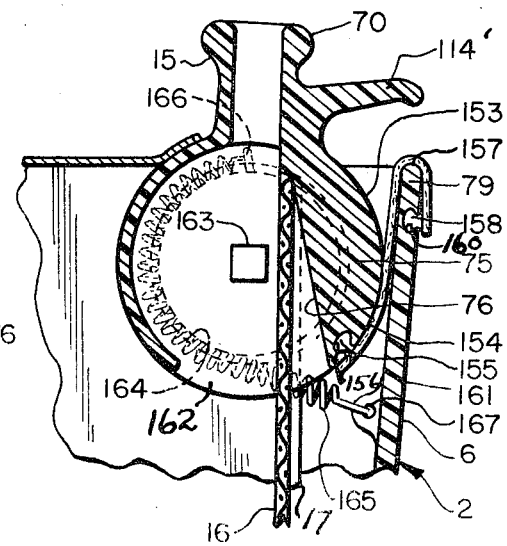

United States Patent Office 3,513,584
Patented May 26, 1970

3,513,584
FISHING BUCKET
Norman W. Donner, 5409 S. Laflin St.,
Chicago, Ill. 60609
Filed Dec. 13, 1968, Ser. No. 783,648
Int. Cl. A01k 97/04
U.S. Cl. 43—56                                    7 Claims

ABSTRACT OF THE DISCLOSURE

A fishing bucket comprising outer and inner containers having a screen swingable on the inner container between a lowered position within the container and an inclined position out of the outer container to surface the bait, the invention being disclosed in several embodiments each providing means for tilting the screen to net the minnows in the bucket, one of these tilting means being a handle operated linkage carried on the inner container and reactable against the outer, and the other two embodiments utilizing a return spring arrangement and the user tilting the screen by downwardly swinging the nozzle to which the screen is attached

DISCUSSION OF THE PRIOR ART

The best prior art is my own patent, No. 3,380,186, which is an improvement over the previous art. The instant inventions are improvements over such art in being simpler to manufacture and assemble, and being less expensive to make and also being more facile to use.

SUMMARY OF THE INVENTION

This invention is directed to a novel bait bucket incorporating novel means for tilting the bait lifting screen between a lowered position within the bucket and an elevated position out of the bucket.

A primary object of the invention is to provide a novel bucket in which the screen is biased to a lowered position and is elevated either by swinging the spout connected thereto or by a handle.

A further object is to devise a container and means for lifting the screen such as to obtain a low silhouette with an essentially flat top to the bucket for better appearance and also to make the bucket easier to manipulate and more stable in a boat.

A still further object is to provide a novel mechanism for not only tilting the inner container but also which lifts it to discharging position.

In several embodiments of the invention means are provided for not only guiding the inner container in tilting it but also lifting the inner container above the top of the outer container to position it in efficient dispensing position.

More specifically in one of these several embodiments the inner container has a gear sector which climbs a rack and in the other the inner container has an arcuate cam or lifting surface which is wrapped about by an elevating strap mounted on the outer container.

A principal object of the several embodiments of the invention is to devise a structure which can be operated with one hand.

In each of these embodiments, the primary object is to devise a bucket having inner and outer containers in which the inner container is lowered into the bucket by the operating mechanism and elevated out of the bucket concurrently with the screen being swung downwardly and upwardly respectively.

These and other objects and advantages will become more readily apparent from the following specification and drawings, wherein:

FIG. 1 is a perspective view of one form of my invention;

FIG. 2 is a perspective view of the inner container thereof;

FIG. 3 is a fragmentary perspective view of the upper portion of the outer container;

FIG. 4 is a perspective view of the screen and nozzle structure;

FIG. 5 is an enlarged transverse vertical sectional view taken substantially on line 5—5 of FIG. 1;

FIG. 6 is a plan view partly in section taken substantially on line 6—6 of FIG. 5;

FIG. 6A is an enlarged segment of a portion of the structure shown in FIG. 6;

FIG. 7 is a plan view partly broken away;

FIG. 8 is a vertical sectional view taken substantially on line 8—8 of FIG. 7;

FIG. 9 is an enlarged sectional view taken substantially on line 9—9 of FIG. 7 showing the structure in upright position;

FIG. 9A is the same view as FIG. 9 but showing the parts in bait-discharging position;

FIG. 10 is a sectional view taken substantially on line 10—10 of FIG. 9;

FIGS. 11 and 11A illustrate a further embodiment;

Figure 8:
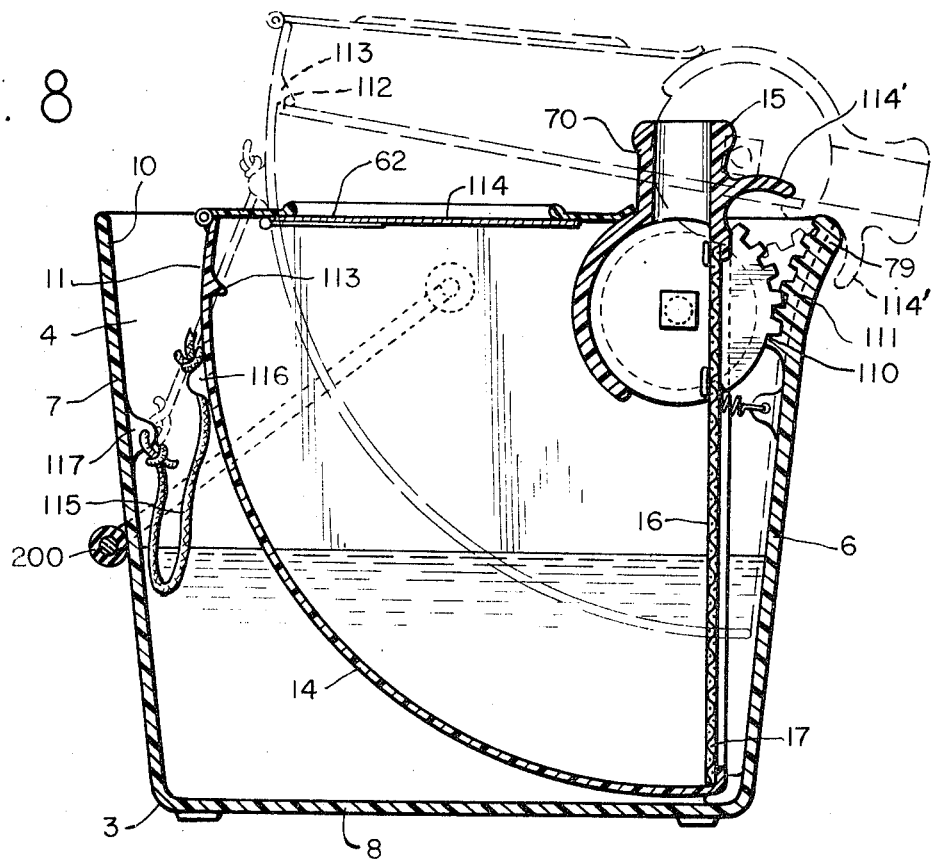
FIGS. 7 and 8 illustrate a further embodiment of the invention.

FIG. 11 being a fragmentary sectional view similar to FIG. 9A; and

FIG. 11A being a sectional view similar to FIG. 9.

DESCRIPTION OF THE EMBODIMENT OF FIGURES 1-6

The bait bucket generally designated 2 comprises an outer quadrilateral container 3 having side walls 4 and 5, front and rear walls 6 and 7 and a bottom 8. The walls 4–7 define an upper opening 10 through which an inner container 11 is inserted into the container 3 or withdrawn therefrom.

The inner container has a pair of upright side walls 12 and 13 which are disposed adjacent to respective walls 4 and 5. A curved continuous rear and bottom wall 14 interconnects the rear edges of walls 12–13 and is concentric with the axis of pivot of a combined screen and nozzle structure 15 which comprises a screen portion 16 having a rectangular frame 17 to which is bonded or otherwise secured the screen 16. The screen portion 16 is dimensioned to closely fit between the side walls 12 and 13. The distal edge 19 of the frame 17 passes in close proximity to the curved inner periphery 20 of rear wall.

The nozzle screen structure 15 comprises a nozzle formed integral with the screen portion at its outer end, the side rails 22, 23 of the frame 17 merging at their outer ends into disk-like enlargements 24, 25 which are coaxially aligned with the axis of pivot which is defined by a pair of coaxial stub shafts 26, 26. The shafts 26, 26 have inner end non-round preferably square portions 28, 28 which fit into complementary apertures 30, 30 in the enlargements 24, 25. Each shaft 26, 26 is fixed to the respective enlargement wall by a pressed on locking element 32 and each shaft has a cylindrical portion 33 extending through a round opening 34 in wall 12 or 13 at their upper forward corners 35, 36. On the outer sides of walls 12 and 13 there are disposed a pair of operating linkages 38, 38.

Each operating linkage comprises an arm 39 having one end 40 connected to the square portion 41 of the respective stub shaft, (the connection being a square opening fitting snugly over the square portion of the respective stub shaft). The free end of each arm 39 is pivotally connected as at 42 to the upper end of a tension link 43 which at its lower end is connected at 44 to the free end of one arm 45 of a bell-crank type reactor element 46 which has its elbow portion 47 adjacent to which it is pivoted as at 48 on a pin 49 mounted on the respective side wall 12 or 13 of the inner container. The leg 50 of the reactor or lifting arm is arranged to extend upwardly (as best seen in FIGS. 1 and 2 in the lowered position of the screen and inner container) alongside the inner side 51 of the forward wall 6 of the outer container. The edge 52 of leg 50 which opposes the wall 6 is curved away from surface 51 toward the distal end of leg 50 to provide a racking surface 52 for leg 50 against surface 51 upon actuation of either of the handles 55, 55 which are connected to the outer ends of stub shafts 26, 26, the stub shafts 26 each having a cylindrical portion 56 which fits into notches 57 formed at the base of hook portions 58 which are provided on the upper margins 59, 60 of the side walls 4 and 5 of the outer container.

It will be noted that the handles 55 are substantially coplanar with the screen portions so that the user can efficiently manipulate the device.

As best seen in FIG. 5 in the discharge position the legs 50 are extended and the inner container is elevated above the upper margins 59, 60 of the outer container and inclined downwardly forwardly with the screen which is spaced from and parallels the cover 62 which is rectangular in cross-section and has a hinge means 63 on its rear edge which are connected by a pintle 64 to hinge means 65 on the upper edge of the rear portion of the curved wall 14. The width of the top cover panel 62 corresponds to the spacing between the side walls 12 and 13 and the forward edge portion 66 of panel 62 is curved upwardly and rests upon the convex upper surface 67 of the bulge portion 68 of the nozzle 70 which has top and bottom webs 71, 72 and side webs 73, 74 which form a rectangular passage for the minnows gravitating from the screen into the user's hand. The bottom web 72 is coplanar with the screen which extends over a lower projection 75 of the bulge portion 68, said projection having an upper surface 76 (FIG. 5) which is angled rearwardly and downwardly in the elevated position of the screen to provide a reentrant water spillway into the bucket between the lower portions of the disk like segments 73, 74. The bottom surface 77 of the extension 75 is concentric with the axis of pivot of the nozzle-screen structure and cooperates as a seal with the inner surface 78 of a forwardly and upwardly angled lip 79 formed on the upper edge of the front wall 6 of the outer container.

Thus it will be seen that the weight of the inner container biases it downwardly into the outer container and thus loads the screen operating linkage to lower the screen and thus provides the biasing means therefor.

The upward movement of the inner container is limited by a stop means comprising the stop 81 projecting from the back of curved wall 14 which engages a forwardly projecting stop 80 on the forward side of the rear wall 7.

EMBODIMENT OF FIGURES 7–10

In this embodiment parts similar to those of the previous embodiment will be identified by the same reference numerals. The screen and nozzle assembly 15 is connected at its sides to shafts 100, 101 which rotate through apertures 102, 103 in the respective side wall 12 or 13. Shafts 100, 101 are connected as by cementing or otherwise to pulleys 104, 104 for rotation therewith.

The pulley 104 has a peripheral groove 106 which guides a tension spring 107 which at one end is connected to an eye 108 formed in the pulley groove and at the other end is connected to an anchor eye 109 formed on the inner side of the front wall 7 adjacent to a proximate lateral edge thereof.

The springs at opposite sides of the screen bias it to an upright position as shown in full lines in FIG. 8.

The nozzle portion 70 in this embodiment is formed with spaced gears sector 110 on its side opposing the front wall 7 of the outer container and each sector 110 meshes with a rack 111 which is formed on wall 7 at the outwardly curved upper lip portion.

In operation the user grasps the nozzle 70 and tilts in forwardly and downwardly stretching springs 107. The screen is swung upwardly until its rear edge 112 engages the forwardly projecting stop 113 on the forward side of rear wall portion 14 adacent to its upper end and is spaced below the cover panel 62 which has a spring loaded access gate 114 through which the user may reach onto the screen, if he desires, or may reach into the inner container when the screen is down.

It will be noted that in this embodiment the inner container as best seen in FIG. 8 climbs up out of the outer container as the assembly 15 rides up the rack pursuant to the nozzle portion 70 being turned down by the user. The nozzle has a projecting shield 114' which extends over the lip 79 and serves as a stop and a protection for the users' fingers to keep them clear and prevent their being pinched. Upward movement of the inner container is limited by the cord 115 connected between the eyes 116, 117 on the back side of rear wall 14 and on the forward side of rear wall 6 of the outer container.

Releasing the nozzle will effect a return to the position of FIG. 8 by the tension springs reacting.

Figure 7:
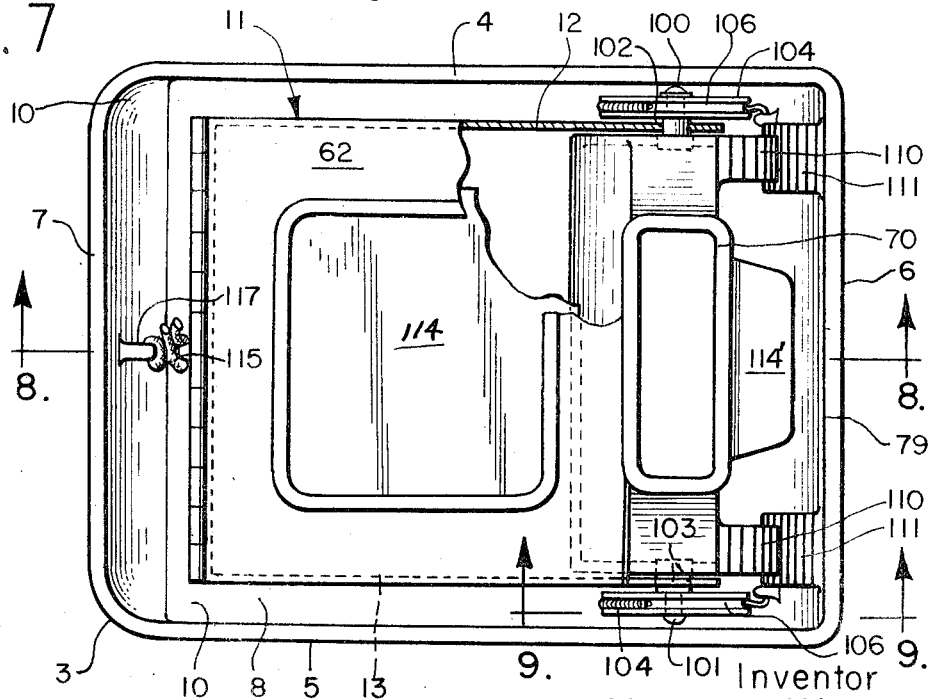

The racks and gear sectors are formed adjacent each side of the inner and outer containers as seen in FIG. 7.

EMBODIMENT OF FIGS. 11 AND 11A

This embodiment is similar to the previous structures and like parts will be identified with the same reference characters. In this structure, the underside of the nozzle 70 is provided at each side of the inner container 11 with a cylindrical surface 153 which rides on a preferably plastic strap 154 which has a snap 155 at one end snapped into an aperture 156 in the portion 75, the strap 153 being trained about a segment of the surface 153 and being lapped over the upper edge 157 of lip 79 and having a snap 158 at its other end and entered into an aperture 160 in the front side 161 of the front wall 6 of the outer container. The tilting of the nozzle 70 first swings the screen 16 upwardly until it is engaged with the rear wall stop 161 as in the previous embodiment and then further rotation of the nozzle lifts the inner container out of the outer one and tilts it as well as the screen. Pulleys 162 are connected by shafts 163, which are similar to shafts 110 (FIG. 10) to each side of the frame 17 of the screen 16. Each shaft 163 pivots with respect to the inner container and the pulleys 162 have grooves 164 each of which guides a spring 165 connected at one end to an eye 166 on the respective pulley and at its other end to an eye 167 on the wall 6.

The springs 166 bias the screen downwardly and the weight of the inner bucket drops it into the outer bucket, said inner bucket riding on the surfaces 153 on the belts 154 into the out of the outer container.

Thus in each embodiment the inner and outer containers are flush at their upper ends and a novel arrangement is provided for lifting and tilting the inner container with reference to the outer. The embodiments of FIGS. 7 and 11 have the added advantage that they permit the user to employ only one hand to tilt the screen and obtain the bait.

Each outer bucket has a handle 200 connected to the walls 4 and 5.

I claim:

1. A bait bucket comprising inner and outer containers, the inner container including a bait-lifting screen pivoted at one end to the inner container for pivotal movement from a pendant position disposed within the bucket to a generally horizontal position for netting bait in the bucket, means for pivoting the screen from said pendant position to a generally horizontal position, and means for thereafter conjunctively elevating the inner container of the bucket and bodily tilting both the screen and the inner container to dispose the said screen to an inclined position from said generally horizontal position to effect migration of the bait on the inclined screen from an upper end thereof to a lower end thereof, and a nozzle disposed to funnel bait from the lower end of the screen attendant to the screen being in said inclined position.

2. The invention according to claim 1 and said means for elevating said inner container and for inclining the screen comprising a handle operated linkage having an arm conected at one end to pivot with said screen, a vertical link having an upper end pivotally connected to the other end of the arm, and a lever pivoted to said inner container at one point and to the lower end of the link at another point and reactively engageable with an opposed wall of the outer container at another point.

3. The invention according to claim 2 and said outer container having an upper portion, and said screen and inner container pivoted on a common axis to the upper portion of the outed container.

4. The invention according to claim 1 and said means for effecting said conjunctive movement comprising a rack means on the outer container and gear means on the inner container in meshing relation with the rack for climbing thereon.

5. The invention according to claim 4 and spring means reactively connected between said containers for biasing said inner container into the outer container.

6. The invention according to claim 1 and said means for effecting said conjunctive movement comprising a strap connected at one end to said inner container, an arcuate section on said inner container disposed to ride on the strap, and means connecting said strap at its other end to the outer container adjacent to its other end.

7. The invention according to claim 6 and spring means stressed between said container for biasing the inner container into said outer container and said screen portion to said pendant position.

References Cited
UNITED STATES PATENTS

| | | | |
|---|---|---|---|
| 2,082,754 | 6/1937 | Peterson | 43—56 |
| 2,884,736 | 5/1959 | Harrell | 43—56 |
| 3,105,320 | 10/1963 | Milanos et al | 43—56 |
| 3,380,186 | 4/1968 | Donner | 43—56 |

WARNER H. CAMP, Primary Examiner